March 2, 1937.  A. NUTSFORD  2,072,311
LIQUID DEPTH OR CONTENTS GAUGE
Filed Jan. 20, 1936
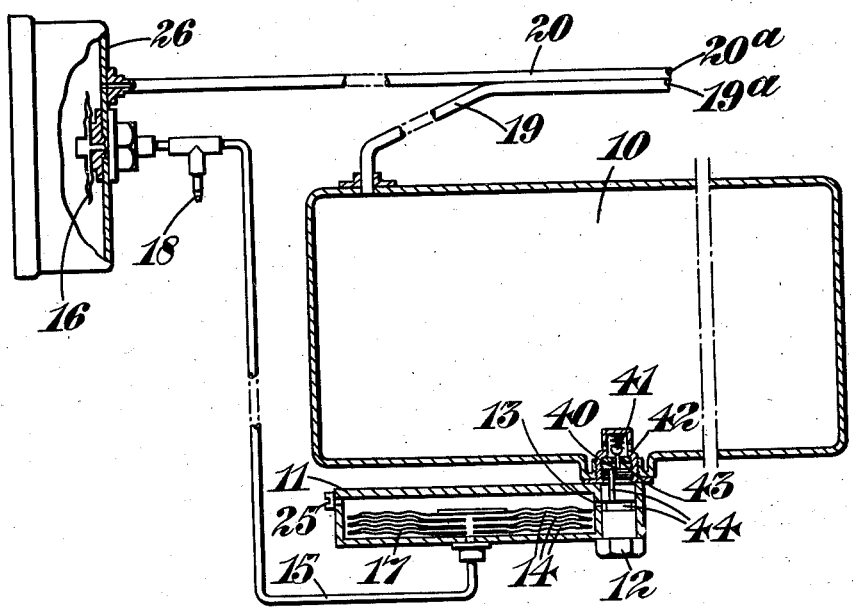
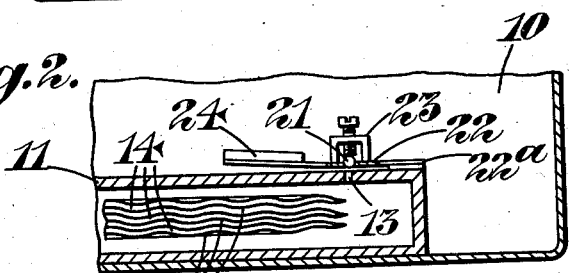
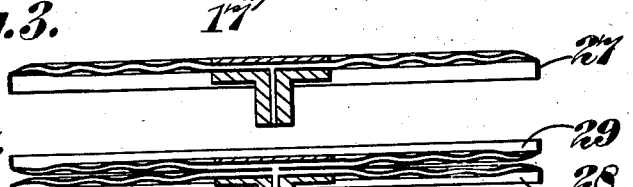
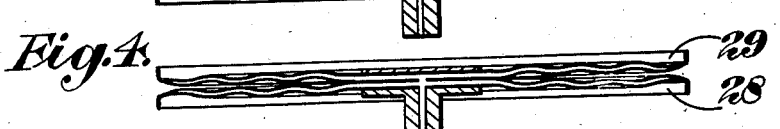
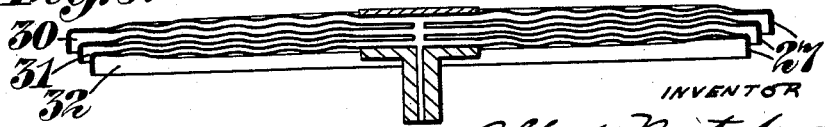
INVENTOR Patented Mar. 2, 1937

2,072,311

UNITED STATES PATENT OFFICE 2,072,311

LIQUID DEPTH OR CONTENTS GAUGE

Alfred Nutsford, Farnborough, England

Application January 20, 1936, Serial No. 59,987
In Great Britain October 12, 1934

1 Claim. (Cl. 73—54)

This application corresponds to the application of Alfred Nutsford, Serial No. 29203/34, which was filed in Great Britain on October 12, 1934.

This invention relates to liquid depth or contents gauges of the kind in which the pressure at the bottom of the liquid is transmitted through a gas to an indicating instrument. The object of this invention is to provide a gauge which will be substantially unaffected by changes in the ambient pressure or temperature.

According to the present invention, a liquid depth or contents gauge comprises an indicating instrument actuated by a "stiff" metal capsule, a "flabby" metal capsule adapted to be immersed in the liquid, the depth or amount of which is to be indicated and a metal conduit connecting the interiors of the capsules. By "flabby" capsule is meant a capsule having a small resistance to deformation so that a small change in the difference between the internal and external pressures acting on the capsule produces a relatively large change in the volume of the capsule.

As explained hereinafter, the employment of a "flabby" capsule minimizes the effect of changes in temperature or of the ambient pressure on the indication given by the instrument. In order to reduce the stiffness of the "flabby" capsule as much as possible it is preferred to use a stack of capsules. The term "capsule" is herein used to include, where the context so permits, a stack of capsules. Preferably the "flabby" capsule is enclosed within a casing formed with a small port for the admission of the liquid. With this arrangement the rise in pressure in the liquid immediately surrounding the capsule due to surging of the liquid, is minimized, but the port does not affect the slow changes in pressure due to the consumption of the liquid. When the gauge is intended for use in an aeroplane or elsewhere where it may be subject to rapid vertical acceleration, provision may be made for isolating the casing when the gauge has an accelerated movement, so that the acceleration does not affect the accuracy of the gauge.

A gauge in accordance with this invention and several modifications thereof will now be described, by way of example only with reference to the accompanying drawing in which:—

Figure 1 shows diagrammatically a contents gauge in accordance with this invention, Figure 2 shows a modification of the gauge shown in Figure 1, and Figures 3, 4 and 5 show three constructions of capsules that may be utilized in the gauge of Figure 1.

The gauge is shown in Figure 1 as applied to indicating the contents of the tank 10. A casing 11 is secured to the tank by means of a bolt 12. This bolt has a part 40 that lifts a spring loaded valve 41, allowing liquid to pass into the casing 11 through ports 42, a port 43, a passage 44 in the bolt and a port 13 in the casing 11. When the casing 11 is to be removed from the tank, the bolt 12 is removed and its removal allows the valve 41 to close the port 43 so that the tank need not be emptied before removing the casing.

A stack of "flabby" capsules 14 is secured within the chamber 11 and is surrounded by the liquid contained in the tank. The interior of the capsules is connected by a narrow bore pipe 15 to a "stiff" capsule 16 of an indicating instrument. The indicating mechanism is not shown but may be similar to that employed in air-speed indicators.

The capsules 14 are each formed by a pair of metal diaphragms 17 having annular corrugations. Each pair of diaphragms is connected together at its outer periphery in the usual manner. In order that the capsules 14 may collapse to the minimum volume possible, the corrugations in the two diaphragms forming one capsule are arranged to mate with one another as shown instead of being opposed to one another as is the usual arrangement. The "stiff" capsule is also formed of two mating diaphragms as shown in Figure 1.

Air or a suitable gas is admitted into the interior of the capsules through a nipple 18 which is subsequently sealed. It is important that the volume of gas in the capsule and pipe system should be as small as possible compatible with being sufficient to ensure that some gas is present in the "flabby" capsules when the tank is full, the ambient pressure is a maximum and the ambient temperature is a minimum. To ensure this, the "stiff" capsule is first subjected to an internal pressure equal to the external pressure plus the liquid head when the tank is full and the reading of the instrument is noted. This is the "Tank full" indication of the instrument. The capsule system is then assembled and the "flabby" capsules are subjected to an external pressure in excess of that to which the tiff capsule was subjected so as to maintain them collapsed during the filling. Gas is then forced in until the instrument reaches the "Tank full" indication. The quantity of gas in the system is then correct for the existing ambient pressure and temperature. The quantity of gas required is noted and about 20% more gas is forced in. The additional gas ensures that the system shall contain sufficient gas to operate properly even if used at a temperature considerably below, or a pressure considerably above, that existing when it was filled.

The pressure within the capsules 14 will be substantially that due to the head of liquid within the tank 10 plus the ambient pressure acting on the surface of the liquid. There will be a slight difference due to the resilience of the capsules, but this is extremely small. The pressure within the capsule 16 is the same as that within the capsules 14, while the pressure outside the capsule is the ambient pressure. Thus the capsule 16 will be deformed until the stress tending to restore it to its normal conformation equals the pressure due to the head of liquid.

The capsules 14 are so "flabby" that the change in the pressure difference between the inside and outside of them required to expand the capsules to their maximum extent from their fully collapsed condition is very small compared with the pressure of the gas within the system comprising the capsules 14 and 16 and the pipe 15. Thus, should the ambient pressure change, the capsules 14 will expand or contract until the pressure within them is again equal to the ambient pressure plus the liquid head. In the same way, should the temperature vary, the pressure within the system 14, 15 and 16 will tend to vary, but the capsules 14 will expand or contract so as to maintain this pressure nearly constant. The deformation of the capsule 16 depends on the difference between the pressure within this capsule and the ambient pressure, and since the pressure within the capsule is very nearly the sum of the liquid head and the ambient pressure the deformation of the capsule is very nearly proportional to the liquid head. The error which is due to the fact that the capsules 14 are not completely non-resistant to deformation is negligible for all practical purposes so that the indication given by the instrument will be accurate for all practical purposes.

It will be appreciated that the pressure on the surface of the liquid within the tank 10 and the pressure within the casing 26 of the instrument must be the same. In stationary installations this will normally be the case, but in an installation on a vehicle or aeroplane, it may be necessary to vent the tank 10 outside the vehicle so that the air pressure within the tank is modified by the flow of air past the vehicle. In such cases the tank is provided with a vent pipe 19, the end of which 19a is located outside the vehicle and may face the air stream past the vehicle. The casing 26 of the instrument is made airtight and is provided with a vent pipe 20, the end of which 20a is close to the open end 19a of the tank vent pipe, and faces in the same direction. Thus the pressure in both pipes and therefore in the casing 26 and tank 10 will be the same.

With the arrangement shown a small vent closed by a plug 25 is provided in the casing 11. When assembling the casing on the tank the plug 25 is removed so that liquid admitted through the pipe 12 into the casing may force out the air within the casing. When the casing has become full of liquid the vent is again closed by the plug 25.

When the gauge is mounted in an aeroplane any upwards acceleration of the aeroplane will increase the pressure in the liquid and cause the gauge to indicate a greater depth of liquid or liquid contents in the tank than is correct. To avoid this the port 13 between the tank 10 and the casing 11 is controlled by a ball valve 21 which lies in a hole through a flat spring 22 and is held in position by a cage 23 secured on the spring. One end of the spring is fixed at 22a while the other end carries a mass 24. The spring is set so that normally it supports the ball 21 in the position shown in which the port 13 is open for the passage of liquid into the casing 11. Should the system be accelerated upwardly, the mass 24 will act to deflect the spring 22 downwardly and move the ball 21 to close the port 13. Thus the pressure of the liquid at the bottom of the tank 10 can be increased by the acceleration without any liquid passing into the casing 11 to increase the pressure therein. The gauge will thus not be affected by upwards acceleration.

It will be seen that the casing 11 in Figure 2 is mounted within the tank instead of being mounted outside the tank. The last named arrangement is preferred since it allows of the removal of the casing without interfering with the tank.

It will be appreciated that the compensation for variations in the ambient pressure and temperature is effected by expansion and contraction of the "flabby" capsules 14 and this expansion and contraction should be as small as possible. The quantity of gas within the system 14, 15, 16 should, therefore, be as small as possible. For this purpose the capsules are designed to have zero volume when unstressed by arranging the corrugations in them to mate. This arrangement has the additional advantage that the capsules cannot be damaged by being subjected to excessive pressure, since in such a case they collapse to zero volume without being permanently deformed.

Each capsule is formed by stamping two circular diaphragms together to form mating corrugations. When the edges of the capsule lie in its general plane, the margins of the diaphragms are first tinned and are heated to join them while they are in the press. It is however preferred to stamp the margin of the capsule into cylindrical form as shown at 27 in Figures 3, 4 and 5 or into frustro-conical form. In this case the diaphragms are interlocked by their margins and can be joined after removal from the press. The overturned margin serves also to maintain the diaphragms planar (ignoring the corrugations) which renders the gauge more accurate. Figure 3 shows a single capsule constructed as just described. Figure 4 shows a stack of two capsules 28 and 29 assembled with their overturned margins 27 directed in opposite directions. Figure 5 shows a stack of three capsules 30, 31 and 32 of decreasing diameter so that their cylindrical margins 27 can nest in one another.

It will be understood that the gauge is not limited in its application to indicating the contents of a tank but can be employed generally for indicating at a distance the head of liquid above the flabby capsules. This head may be varied in accordance with the adjustment of a mechanism so that the gauge indicates, indirectly the condition of the mechanism.

I claim:—

A liquid depth or contents gauge, comprising an indicating instrument, a stiff metal capsule for actuating the instrument, a flabby metal capsule, a casing enclosing the flabby capsule and formed with a port for the admission of liquid whose depth or amount is to be indicated, a valve controlling the port, a mass operatively connected to the valve to actuate it to close the port when the gauge is accelerated in a predetermined direction, and a metal conduit connecting the interiors of the two capsules.

ALFRED NUTSFORD.